United States Patent
Tarnowsky et al.

(10) Patent No.: US 8,346,420 B2
(45) Date of Patent: Jan. 1, 2013

(54) SYSTEM AND METHOD FOR PREDICTING VEHICLE ENERGY CONSUMPTION

(75) Inventors: Steven A. Tarnowsky, West Bloomfield, MI (US); Edward D. Tate, Jr., Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 311 days.

(21) Appl. No.: 12/729,275

(22) Filed: Mar. 23, 2010

(65) Prior Publication Data
US 2011/0238257 A1    Sep. 29, 2011

(51) Int. Cl.
*B60L 9/00* (2006.01)
*B60L 11/00* (2006.01)
*G05D 3/00* (2006.01)
*G05D 1/00* (2006.01)
*G06F 7/00* (2006.01)
*G06F 17/00* (2006.01)

(52) U.S. Cl. .................. 701/22; 701/408; 701/521
(58) Field of Classification Search .................. None
See application file for complete search history.

(56) References Cited

U.S. PATENT DOCUMENTS

| 6,505,106 B1 * | 1/2003 | Lawrence et al. | 701/29.3 |
| 2011/0130885 A1 * | 6/2011 | Bowen et al. | 700/291 |
| 2011/0130905 A1 * | 6/2011 | Mayer | 701/22 |

* cited by examiner

*Primary Examiner* — Paul Danneman
(74) *Attorney, Agent, or Firm* — Quinn Law Group, PLLC

(57) ABSTRACT

A method is provided for generating projected vehicle energy consumption information for a second vehicle using statistical information describing a driving history of a driver of a first vehicle. Statistical information is determined from collected vehicle performance values while the driver operates the first vehicle, and is archived in at least one memory location. The archived statistical information is correlated with a vehicle specification describing a performance capability of the second vehicle. A message is processed that includes the projected vehicle energy consumption information for the second vehicle. A vehicle is provided for generating the projected vehicle energy consumption information, and includes at least one memory location, sensors for measuring vehicle performance values of the vehicle describing a driver history of the first vehicle, and a controller adapted for automatically determining the statistical information. A controller is also provided adapted for executing the method.

18 Claims, 1 Drawing Sheet

SYSTEM AND METHOD FOR PREDICTING VEHICLE ENERGY CONSUMPTION

TECHNICAL FIELD

The present invention relates to a system and a method for projecting or estimating vehicle energy consumption information in a prospective vehicle.

BACKGROUND OF THE INVENTION

Relative to vehicles that use internal combustion engines as the sole power source, emerging vehicle designs take advantage of the relative efficiency of electric motors, particularly at low speeds, as an alternate power source. For example, a hybrid electric vehicle combines the selective operation of an electric motor to enhance fuel economy, such as by selectively shutting off the engine when the vehicle is at a standstill, via regenerative braking, or via electric propulsion, depending on the vehicle configuration. Other designs such as the plug-in hybrid electric vehicle and extended range electric vehicle provide off-board and on-board energy recharging capabilities, respectively. Relative to conventional vehicles, these emerging designs may provide superior fuel economy under certain driving profiles.

SUMMARY OF THE INVENTION

Accordingly, a system is provided for projecting or estimating energy consumption of a given driver in a prospective vehicle, i.e., a second vehicle that is being considered for purchase or lease by the driver of a first vehicle. The first vehicle has an onboard controller with an algorithm. When executed by the controller, the algorithm automatically collects measures, senses, or otherwise collects vehicle performance values, and from these determines statistical information describing the driver's demonstrated driving behavior or profile. Fuel consumption rates and distance traveled, and/or other such useful statistical information, is automatically sampled and archived online aboard the first vehicle and/or offline. That is, archiving may occur online aboard the vehicle, where it may be accessed directly or via a removable flash, USB, or other drive or storage media upon sale or lease turn in of the first vehicle, and/or offline via a remote station by automatically uploading the information using a vehicle telematics system, e.g., OnStar®, Bluetooth®, etc.

Data for a given first vehicle and driver may be used to generate tailored driving statistics, i.e., statistical information that is specific to a particular vehicle design and its driver(s) over a period of time. Periodically, the driver could be sent a message containing information related to projected consumption rates in one or more prospective vehicles. Alternately, a link may be provided so that the driver can later access a website containing the message. The driver, when considering another vehicle for purchase or lease, could use the system set forth herein to determine their personalized, expected fuel consumption for the prospective vehicle(s).

For a vehicle adapted for electric propulsion, the system could help predict the amount of electricity likely to be consumed over a specified time period based on the driver's unique driving behavior, as determined by the compiled statistical information. Expected fuel and electricity costs could be calculated for the prospective vehicle based on the same statistics, as well as other factors such as local electric utility rates and the current average price of gasoline.

In particular, a method is provided for generating projected vehicle energy consumption information for a second vehicle using statistical information describing a driving history of a driver of a first vehicle. The method includes automatically collecting the vehicle performance values and determining from these values the statistical information. The statistical information is archived in a first memory location aboard the first vehicle and/or a second memory location that is remotely located with respect to the first vehicle. The statistical information is then correlated with a vehicle specification describing a performance capability of the second vehicle, and a message is transmitted, e.g., to the driver, another potential vehicle operator, a salesperson, etc., that includes the projected vehicle energy consumption information for the second vehicle.

A vehicle is adapted for generating the projected vehicle energy consumption information. The vehicle includes at least one memory location, sensors for determining a set of performance values for the first vehicle, and a controller. The controller automatically determines the statistical information from the performance values while the driver operates the first vehicle, archives the statistical information in the memory location(s), correlates the statistical information with a vehicle specification describing a performance capability of the second vehicle, and processes a message that includes the projected vehicle energy consumption information.

A controller is also provided for use in a vehicle, and includes at least one memory location and an algorithm. The algorithm is adapted for automatically determining the statistical information via the vehicle performance values while the driver operates the vehicle. Additionally, the algorithm archives the statistical information in the memory location(s), correlates the statistical information with a vehicle specification describing a performance capability of a prospective vehicle, and processes, i.e., transmits and/or receives, a message that includes projected vehicle energy consumption information for the prospective vehicle. The projected vehicle energy consumption information for the prospective vehicle is determined using the statistical information.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
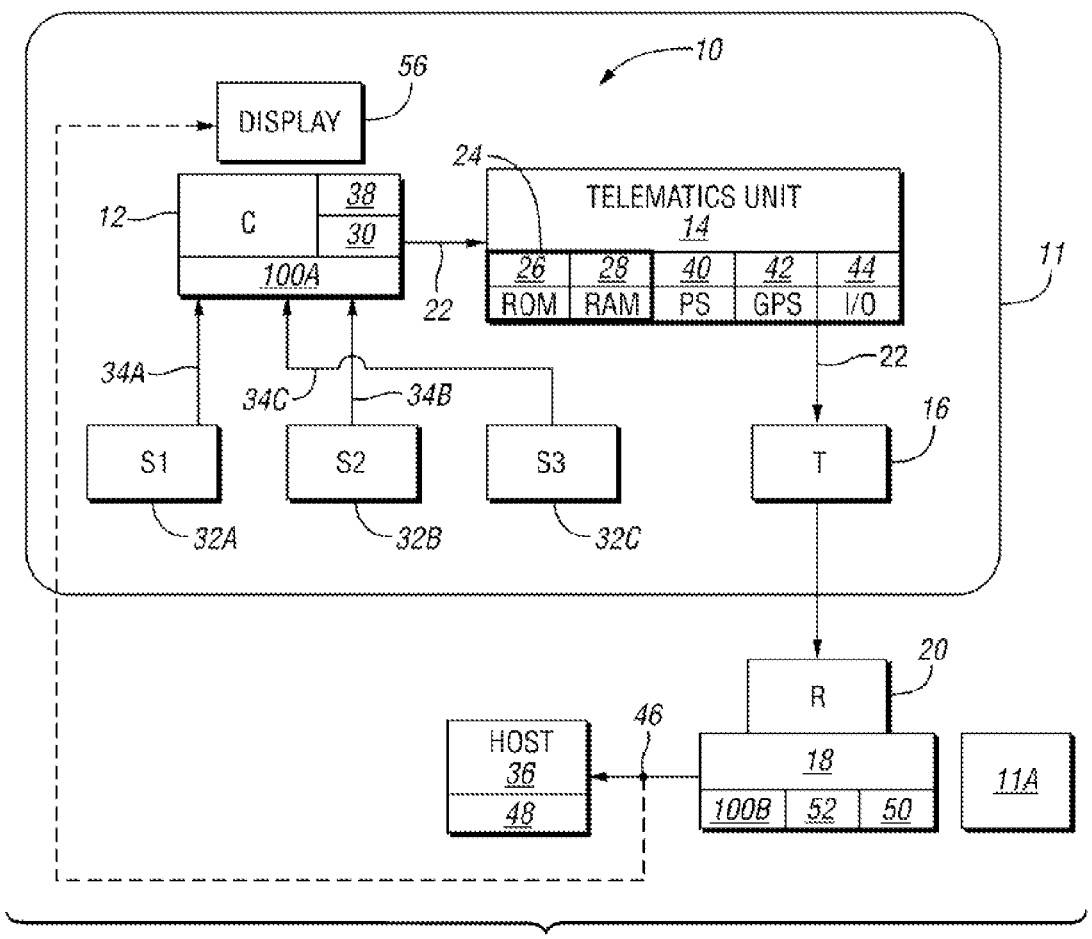
FIG. 1 is a schematic illustration of a system for projecting or estimating energy consumption rates of a given driver in a prospective vehicle.

Referring to the drawings, wherein like reference numbers correspond to like or similar components throughout the several figures, FIG. 1 shows a system 10 that is specially adapted for projecting or estimating energy consumption rates of a given driver when that driver operates a prospective vehicle 11A, i.e., a second vehicle. The system 10 includes a vehicle 11, i.e., a first vehicle, having a controller (C) 12. The controller 12 includes an algorithm 100A adapted for automatically sampling and archiving a predetermined set of vehicle statistical information 22, e.g., energy consumption and distance traveled, along with any other additional vehicle and/or environmental information as described below. The system 10 includes another algorithm 100B, i.e., a second portion of a combined algorithm 100 as described with reference to FIG. 2, which correlates the statistical information 22 with a prospective vehicle or vehicles 11A and generates a message 46 for consumption by the driver of vehicle 11.

In one embodiment, the controller 12 communicates the statistical information 22 to an on-board vehicle telematics unit 14 for uploading to a remote station 18. A driver of vehicle 11 is ultimately informed, via the remote station 18 or directly in the alternate embodiment described below, as to the potential fuel economy and/or relative benefit of driving a different vehicle in the future. For example, a driver of vehicle 11, e.g., a conventional sedan, truck, cross-over, or sport utility vehicle, may wish to know, based on that driver's unique driving behavior as statistically modeled by the controller 12, the relative benefit of driving prospective or second vehicle 11A, e.g., a conventional vehicle, a Battery Electric Vehicle (BEV), a Plug-in Hybrid Electric Vehicle (PHEV), or an Extended-Range Electric Vehicle (EREV). In the case of the BEV, PHEV, and EREV, the system 11 may be configured to estimate additional energy consumption and operating cost benefits of "opportunity charging" the vehicle at work, one or more commercial locations, or other locations as specified by the driver of vehicle 11.

Aboard vehicle 11, the vehicle telematics unit 14, e.g., using Bluetooth®, OnStar®, or other suitable system, uses a transmitter (T) 16 to communicate with the remote station 18. Telematics unit 14 is configured to monitor, record, and transmit the statistical information 22 pertaining to operation of vehicle 11 by a given driver. Telematics unit 14 may also be configured to monitor internal communication, such as bus traffic between various distributed control modules of the controller 12 when the controller is so configured. The statistical information 22 may be transmitted from memory 24 to the remote station 18, or simply recorded and retained within memory for later access and processing. As described below, the vehicle 11 may be equipped with a display screen 56 adapted for displaying messages 46 in the form of text messages, e-mail, Hypertext Transfer Protocol (HTTP) links, etc.

Still referring to FIG. 1, memory 24 may include read only memory (ROM) 26 and random access memory (RAM) 28. ROM 26 may include the basic operating system of the telematics unit 14, and/or any other required data, communications protocols, and operating parameters which generally require permanent storage and rapid accessibility. The function of RAM 28 may include the manipulation and storage of vehicle performance values and other vehicle operating data as set forth below. Telematics unit 14 may also include a power supply (PS) circuit 40, a global positioning system (GPS) circuit 42, and an input/output (I/O) interface 44, as understood in the art.

The controller 12 may be configured as a digital computer generally comprising a microprocessor or central processing unit 30, read only memory (ROM), random access memory (RAM), electrically-erasable programmable read only memory (EEPROM), high-speed clock, analog-to-digital (A/D) and digital-to-analog (D/A) circuitry, and input/output circuitry and devices (I/O), as well as appropriate signal conditioning and buffer circuitry. Any algorithms resident in the controller 12 or accessible thereby, including algorithm 100A as described below with reference to FIG. 2, can be stored and executed to provide the respective functionality.

CPU 30 is configured to generate data in response to a set of signals or sensory data 34A, 34B, 34C from a corresponding set of sensors (S) 32A, 32B, 32C, and for transmitting the statistical information 22 to the telematics unit 14 if so configured. The number and type of sensors may vary from the embodiment shown. In one embodiment, the CPU 30 automatically transmits the statistical data 22 to the telematics unit 14 at calibrated intervals. In this manner, data describing the vehicle's operation is automatically made available for further analysis without driver input. CPU 30 may also be configured to transmit such information in response to direct operator input, e.g., from a manual transmit button (not shown), or in any other suitable manner.

Controller 12 may also include removable flash memory 38. In one embodiment, a driver of the vehicle 11 may remove the flash memory 38 from the vehicle so that a technician might access the archived or stored statistical information 22 offline. For example, when a driver is shopping for a new vehicle, the dealership might access the flash memory 38 and download the archived statistical information 22 to a host machine (HOST) 36. The host machine 36 can process the statistical information 22 against a set of vehicle specifications 50 to correlate the statistical information with one or more prospective vehicles. In this manner, the system 10 helps to evaluate a fit between the driver and any number of prospective vehicles in advance of a vehicle transaction.

In another embodiment, the telematics unit 14 is configured to transmit the statistical information 22 to the remote station 20 via a wireless connection. Those skilled in the art will recognize a variety of wireless mechanisms exist which can be employed to establish communications between the telematics unit 14 and the remote station 18. For example, the telematics unit 14 may be configured to transmit the statistical information 22 via satellite or a cellular network.

Still referring to FIG. 1, sensors 32A, 32B, 32C, collectively referred to herein as sensors 32 for simplicity, collect vehicle performance values describing a driver's unique driving behavior. Data from sensors 32 may include, but is not limited to, information describing vehicle speed history, Heating, Ventilation, and Air Conditioning (HVAC) usage history, location history of the vehicle 10, dates, times of day during which the vehicle is operated, odometer readings, etc. Data from the sensors 32 is used by the controller 12 to automatically calculate values needed for later correlation with a prospective vehicle. For example, controller 12 may generate or compile statistical information 22 for transmission to the remote station 20, and/or for onboard storage and archiving in memory 24 and/or flash memory 38.

Statistical information 22 is specific to the vehicle 11 and any driver(s) thereof over a period of time, and could also include, without being limited to: average fuel consumption or average vehicle speed over a specified time period; a cumulative density function chart describing the percentage of driving where less than a predetermined amount of fuel consumption was achieved over the specified time period; a probability density function chart showing a distribution of fuel consumption over the specified time period; a cumulative density function chart showing a percentage of driving where greater than a threshold distance was achieved over the specified time period; a probability density function chart showing distribution of driving distances over the specified time period; and city driving fuel consumption, which is defined as the average fuel consumption for all driving over a specified time period where the average vehicle speed over a given key operating cycle is below a specified vehicle speed.

Statistical information 22 may further include: highway driving fuel consumption defined as the average fuel consumption for all driving over a specified time period where the average vehicle speed over a given key cycle was above a specified speed; city driving fuel consumption divided by vehicle label city fuel consumption; highway driver intensity factor defined as highway driving fuel consumption divided by the vehicle label city fuel consumption; composite driver intensity factor defined as average fuel consumption divided by the vehicle label composite fuel consumption; local electric utility rates; the current and/or projected average price of gasoline; etc.

Periodically, the driver could be sent messages 46 from the remote station 20 with some or all of the information described, which may be correlated with a detailed vehicle recommendation. Alternately, the driver may use or access the host machine 36 via a website 48 or other application for the same message 46. In addition to the statistical information 22 described above, the vehicle owner could be reminded periodically that, if they are considering the purchase of another vehicle, they could use the system 10 as described herein to calculate their personalized expected fuel consumption rate for the prospective vehicle(s). The system 10 could generate this by multiplying the city, highway, and composite consumption rates as described above by the publicly-available certified fuel consumption numbers (city, highway, and composite respectively) for the prospective vehicle(s).

Note that although many of the metrics and statistics described above are related to fuel consumption, fuel economy information could also be provided. For certain prospective hybrid or electric vehicles, the system 10 could also predict the amount of electricity that would likely be consumed over a specified time period based on the driving statistics described above, which may be of particular value in certain OEM vehicles having a certified charge depleting range.

Figure 2:
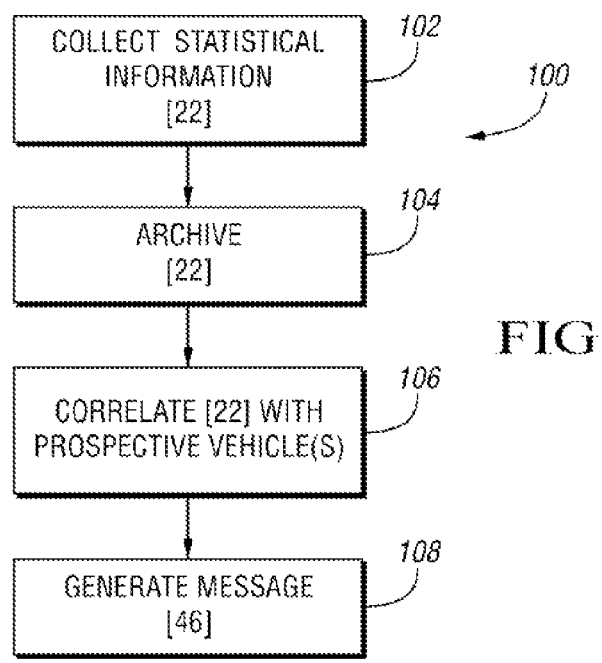
FIG. 2 is a graphical flow chart describing an algorithm usable as part of the system shown in FIG. 1.

Referring to FIG. 2 in conjunction with the elements of system 10 shown in FIG. 1, the algorithm 100 includes the algorithms 100A and 100B. Steps 102-104 define algorithm 100A, and in one embodiment are executed by the controller 12. Steps 106-108 define algorithm 100B, and in the same embodiment are executed by the host machine 36. However, the algorithm 100 may be executed in whole by the controller 12, particularly when a telematics unit 14 is not used, to provide a similar result.

At step 102, the vehicle performance values, i.e., sensory data 34A, 34B, 34C from sensors 32A, 32B, 32C, are collected, and the statistical information 22 described above is automatically determined aboard vehicle 11 using the controller 12. Sensory data 34A, 34B, 34C is collected and relayed to the controller 12 for processing, and the statistical information 22 is calculated or otherwise determined by controller 12. Step 102 may be executed continuously, or at periodic intervals, depending on the design. Optionally, step 102 may include recording at least one electrical charging location for the vehicle 11A, information which may be used by the controller 12 in generating the statistical information 22. The algorithm 100 proceeds to step 104.

At step 104, the controller 12 prepares the statistical information for archiving. In an embodiment in which the telematics unit 14 is used, the controller 12 transmits the statistical information 22 to the remote station 18 via the telematics unit 14, with archiving occurring in the remote station, e.g., in a server 52 or other device having tangible memory. Such a server 52 may be configured as a digital computer that is substantially the same in form as the controller 12 described above, i.e., having a CPU, RAM, ROM, EEPROM, etc. When the statistical information 22 is sufficiently archived, the algorithm 100 proceeds to step 106.

At step 106, the remote station 18 correlates the statistical information 22 with specifications 50 of various prospective vehicles 11A. The algorithm 100 then proceeds to step 108.

At step 108, remote station 18 generates a message 46 for display or transmission to the driver of vehicle 11, e.g. for display via the display screen 56. That is, upon correlation at step 106, a message 46 may be generated that uniquely describes the performance the driver of vehicle 11 might expect if the same driver were to operate a prospective vehicle 11A, and/or relative or comparative data for vehicles 11 and 11A. For example, a driver having a history of heavy stop-and-go operation, as reflected in the driver's statistical information 22, and less than a threshold commuting range, might be paired with a PHEV, EREV, BEV, or a more fuel-efficient conventional vehicle. The recorded electrical charging location(s) from step 102 may be used in this determination.

Additionally, the performance that the driver could expect for each prospective vehicle may be described in message 46 using the statistical information 22 directly, or by calculating or deriving a customized report explaining the statistical information in plain language, and/or using comparative visual aids such as pie charts, bar graphs, etc. Likewise, message 46 may provide relative performance data, i.e., data comparing the relative performance of the driver's present vehicle with that of one or more prospective vehicles, e.g., savings in fuel or other vehicle operating expenses, given the driver's demonstrated driving history.

In this manner, a driver of vehicle 11 can make an informed decision as to a prospective replacement vehicle using the driver's actual or demonstrated driving history. In the example of a PHEV, EREV, or BEV, unlike conventional vehicles, fuel economy is a strong function of distance traveled between battery charging events. For example, if a driver charges a vehicle once per day at home, drives to work and back each day, and the distance to and from work is less than the calibrated electric range of the prospective vehicle, that driver could enjoy a theoretically infinite fuel economy, as gasoline might never be used in significant volume.

At the other end of the spectrum, a driver who commutes well in excess of the electric range of a prospective vehicle would experience finite or limited fuel economy. By calculating a customized, individual utility factor for a particular driver, the system 10 allows a potential customer the ability to more accurately predict their fuel and electricity consumption in a class of vehicles versus any label that is representative of a much larger population. Likewise, drivers of conventional vehicles might prefer a vehicle having a powertrain that is well adapted to the driver's unique driving habits and history.

While the best modes for carrying out the invention have been described in detail, those familiar with the art to which this invention relates will recognize various alternative designs and embodiments for practicing the invention within the scope of the appended claims.

The invention claimed is:

1. A method for generating projected vehicle energy consumption information for a second vehicle using statistical information describing a driving history of a driver of a first vehicle, the method comprising:

automatically collecting a set of vehicle performance values from at least one sensor of the first vehicle, while the driver operates the first vehicle, in order to determine the statistical information;

archiving the statistical information in at least one memory location;

correlating, via a controller, the statistical information archived in the at least one memory location with a vehicle specification describing a performance capability of the second vehicle; and transmitting a message that includes the projected vehicle energy consumption information for the second vehicle and that is based on the driving history of the driver of the first vehicle;

wherein the first vehicle is selected from the group consisting essentially of a conventional vehicle, a battery electric vehicle, a plug-in hybrid electric vehicle, and an extended-range electric vehicle, and wherein the second vehicle is a different member of the group than the first vehicle.

2. The method of claim 1, wherein the at least one memory location includes a first memory location aboard the first vehicle and a second memory location that is remotely located with respect to the first vehicle.

3. The method of claim 2, wherein the first vehicle includes a vehicle telematics unit, the method further comprising:
using the vehicle telematics unit to transmit the statistical information to the second memory location; and
archiving the statistical information in the second memory location.

4. The method of claim 2, wherein the first vehicle includes a flash memory device configured as the first memory location, and wherein archiving the statistical information includes recording the statistical information in the flash memory device.

5. The method of claim 1, wherein transmitting a message includes at least one of: transmitting an e-mail message, displaying a text message, and displaying an HTTP link.

6. The method of claim 1, wherein the set of vehicle performance values includes historical information describing, for the first vehicle, at least one of: speed, Heating, Cooling, and Air Conditioning (HVAC) use, locations of use, dates of use, and odometer readings.

7. The method of claim 1, wherein determining the statistical information includes automatically calculating at least one of: average fuel consumption, average vehicle speed, a cumulative density function chart, a probability density function chart, city driving fuel consumption, and highway driving fuel consumption.

8. The method of claim 1, further comprising:
recording at least one electrical charging location for the second vehicle; and
estimating a predetermined set of operating costs of the second vehicle using the least one electrical charging location.

9. A first vehicle that projects vehicle energy consumption information for a second vehicle using statistical information describing a driving history of a driver of the first vehicle, the first vehicle comprising:
at least one memory location;
a plurality of sensors that determine a set of vehicle performance values of the first vehicle; and
a controller in communication with the sensors that is configured to automatically determine the statistical information using the set of vehicle performance values while the driver operates the first vehicle;
wherein the first vehicle is selected from the group consisting essentially of a conventional vehicle, a battery electric vehicle, a plug-in hybrid electric vehicle, and an extended-range electric vehicle, and is configured to:
archive, via the controller, the statistical information in the at least one memory location;
correlate the statistical information that is archived in at least one memory location with a vehicle specification describing a performance capability of the second vehicle, wherein the second vehicle is a different member of the group than the first member; and
process a message that includes the projected vehicle energy consumption information for the second vehicle and that is based on the driving history of the driver of the first vehicle.

10. The vehicle of claim 9, wherein the at least one memory location includes a first memory location aboard the first vehicle.

11. The vehicle of claim 10, wherein the first vehicle includes a flash memory device configured as the first memory location, and wherein the controller archives the statistical information by recording the statistical information in the flash memory.

12. The vehicle of claim 10, further comprising a telematics unit, wherein the first vehicle is configured for using the telematics unit to transmit the statistical information to a remote station, and for archiving the statistical information in a second memory location of the remote station.

13. The vehicle of claim 10, wherein the controller is configured for displaying, via a display screen of the first vehicle, a message that includes at least one of: an e-mail message, a text message, and an HTTP link.

14. The vehicle of claim 10, wherein the statistical information includes at least one of: average fuel consumption, average vehicle speed, a cumulative density function chart, a probability density function chart, city driving fuel consumption, and highway driving fuel consumption.

15. A controller for use in a vehicle, comprising:
at least one memory location;
a processor in communication with the at least one memory location; and
an algorithm recorded in the at least one memory location and configured for to automatically determine statistical information from a set of vehicle performance values describing a driving history of a driver of the vehicle, wherein the controller, using at least one sensor of the vehicle, collects the set of vehicle performance values while a driver operates the vehicle;
wherein the controller is configured to execute the algorithm using the processor to thereby:
archive the statistical information in the at least one memory location;
correlate the statistical information archived in the at least one memory location with a vehicle specification describing a performance capability of a prospective vehicle, wherein the vehicle is selected from the group consisting essentially of a conventional vehicle, a battery electric vehicle, a plug-in hybrid electric vehicle, and an extended-range electric vehicle, and the prospective vehicle and the vehicle are different members of the group; and
at least one of: transmit and receive a message that includes projected vehicle energy consumption information for the projected vehicle, wherein the projected vehicle energy consumption information for the vehicle is determined by the controller using the statistical information.

16. The controller of claim 15, wherein the memory location is a flash memory device.

17. The controller of claim 15, wherein the vehicle includes a vehicle telematics unit configured for transmitting the statistical information to a remote station, and wherein the controller is configured for communicating the statistical information to the telematics unit.

18. The controller of claim 15, wherein the vehicle includes a display screen, and wherein the controller is configured for displaying the message via the display screen.

* * * * *